United States Patent [19]

Spaulding

[11] 4,242,621
[45] Dec. 30, 1980

[54] PROGRAMMABLE LIMIT SWITCH FOR A MOVABLE MEMBER, PARTICULARLY A MACHINE TOOL SLIDE

[76] Inventor: Carl P. Spaulding, 1530 Mirasol Dr., San Marino, Calif. 91108

[21] Appl. No.: 889,934

[22] Filed: Mar. 27, 1978

[51] Int. Cl.³ .............................................. G05B 19/29
[52] U.S. Cl. .................................... 318/601; 318/569; 318/600; 318/626; 318/603
[58] Field of Search ............... 318/569, 600, 601, 626, 318/603; 364/474

[56] References Cited

U.S. PATENT DOCUMENTS

| | | | |
|---|---|---|---|
| 3,584,284 | 6/1971 | Beach et al. | 318/569 |
| 3,974,432 | 8/1976 | Thompson | 318/569 |

Primary Examiner—Gene Z. Rubinson
Assistant Examiner—Eugene S. Indyk
Attorney, Agent, or Firm—Christie, Parker & Hale

[57] ABSTRACT

A first signal representative of the position of a movable member, such as a machine tool slide, is generated. A plurality of second signals each representative of one or more positions and one of a plurality of actuatable output switches is stored in an addressable memory. The first signal is compared with each of the plurality of second signals stored in the memory. Responsive to the comparison, the output switch represented by one of the plurality of second signals is actuated when the one or more positions represented by such one of the plurality of second signals coincides with the position represented by the first signal.

25 Claims, 7 Drawing Figures

PROGRAMMABLE LIMIT SWITCH FOR A MOVABLE MEMBER, PARTICULARLY A MACHINE TOOL SLIDE

BACKGROUND OF THE INVENTION

This invention relates to process control and, more particularly, to improved apparatus for actuating a process controller responsive to a movable member, such as a machine tool slide.

Process controllers are used in many fields to carry out automatic operation of a process. For example, process controllers automatically operate machine tools responsive to cam actuated mechanical limit switches that sense the position of the machine tool slide on which the work piece is supported. A limit switch is actuated when the slide is positioned between limits, inside of which a particular operation is to be performed; while the limit switch is so actuated, it supplies an electrical activating signal to a particular input of the process controller, which carries out the desired operation.

In machine tools that perform a large number of operations, many limit switches must be coupled to the slide to activate the process controller. These limit switches are costly and bulky and require continual adjustment as the moving parts wear. Prior to initial start-up on a series of operations, delicate fine tuning of the limit switch position is necessary to ensure satisfactory operation. When the machine tool is reprogrammed to perform different operations, the limit switches must be repositioned anew.

SUMMARY OF THE INVENTION

According to the invention, electrical control signals for automatically carrying out a position dependent process are generated by a programmable electronic limit switch, including an addressable memory for storing positional limits and a special purpose computer for comparing the stored limits with the actual position of a movable member on which the process is to be performed. Specifically, the process comprises machine tool operations, and the movable member comprises a machine tool slide on which the work piece or the cutting tool is supported. Therefore, the bulk, cost, and complexity of cam actuated mechanical limit switches are avoided, there is no need for continual adjustment of the apparatus, and fine tuning of a new program is facilitated because it is performed electronically.

More particularly, a first signal representative of the position of the movable member is generated. A plurality of second signals each representative of one or more positions, and one of a plurality of actuatable output switches are stored in an addressable memory. The first signal is compared with each of the plurality of second signals. Responsive to the comparison, the output switch represented by one of the plurality of second signals is actuated when the one or more positions represented by such one of the plurality of second signals coincides with the position represented by the first signal.

A feature of the invention is a plurality of second signals each representative of a plurality of positions between an upper limit and a lower limit, and a comparator comprising a single exclusive OR gate. The first signal is compared with each of the plurality of second signals sequentially on a digit-by-digit basis in descending order of significance. A first memory device stores a first indication when the compared digit of the first signal is larger than the compared digit of the second signal being compared. The first memory device is locked out after it stores the first indication for each limit of each second signal. A second memory device stores a second indication when the first indication is stored in the first memory device after comparison of the first signal and one limit of each second signal. A third memory device stores a third indication responsive to the exclusive OR gate when the second indication is stored in the second memory device and the first indication is not stored in the first memory device after comparison of the first signal and the other limit of each second signal. Thus, the comparison is carried out by a relatively simple electronic circuit design that shares components to a high degree.

Another feature of the invention is a source of a signal representative of a selected machine tool head and a plurality of second signals stored in the addressable memory, each representative in part of a particular machine tool head. The head represented by each of the plurality of second signals is compared with the selected head represented by the source. When the comparison indicates a lack of identity, actuation of the output switches is disabled. Therefore, a verification of the program is obtained.

Still another feature of the invention is a plurality of second signals each having a first field representative of one or more positions, and a second field representative of a particular output switch. When the comparison indicates that the one or more positions represented by the first field of one of the plurality of second signals coincides with the position represented by the first signal, the output switch represented by the second field of such one of the plurality of second signals is actuated. Thus, the relationship between the positions and the output switches can be reprogrammed by simply changing the second signals stored in the addressible memory.

BRIEF DESCRIPTION OF THE DRAWINGS

The features of a specific embodiment of the best mode contemplated of carrying out the invention are illustrated in the drawings, in which.

DETAILED DESCRIPTION OF THE SPECIFIC EMBODIMENT

Figure 1:
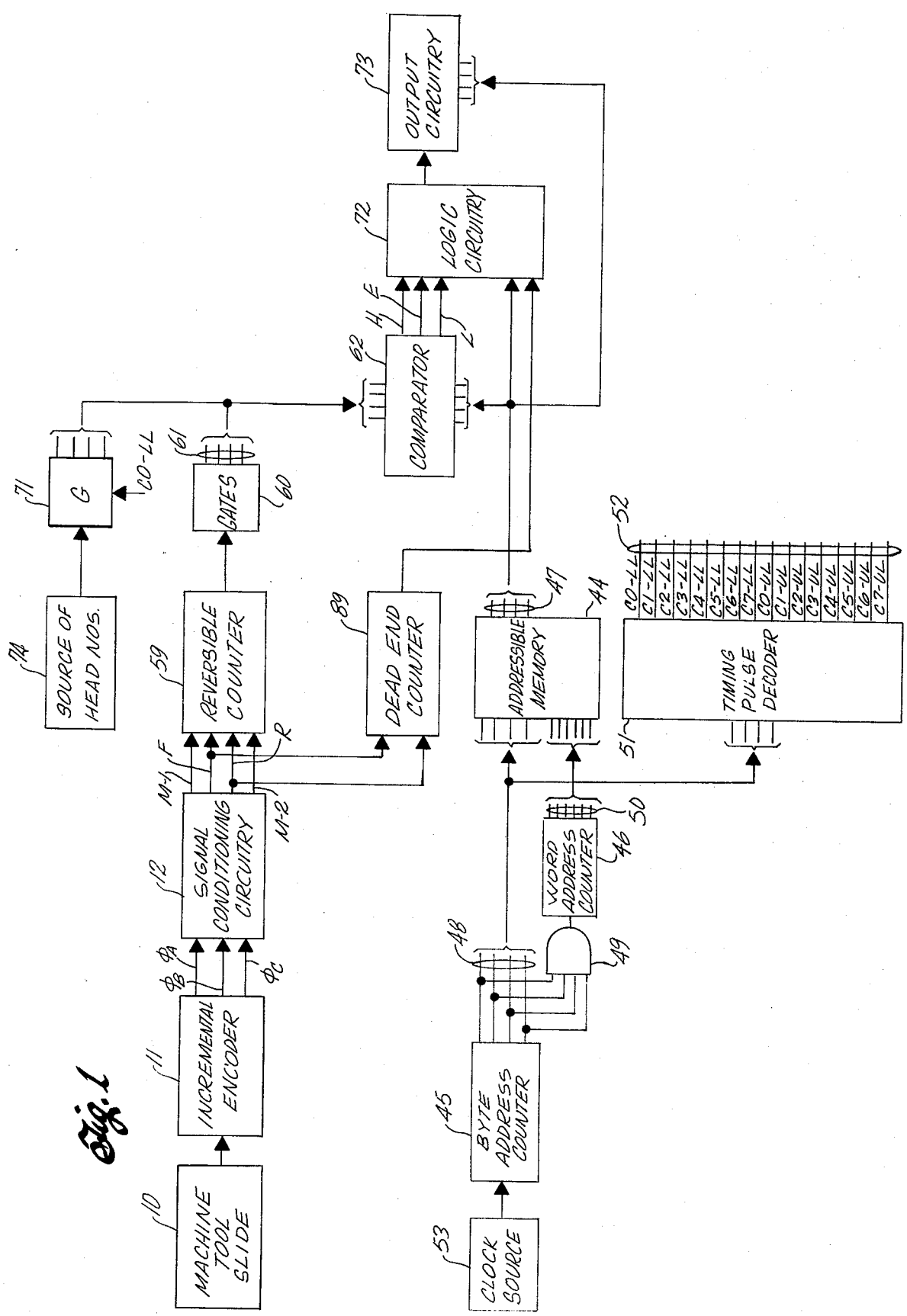
FIG. 1 is a schematic block diagram of a programmable electronic limit switch incorporating the principles of the invention.

In FIG. 1, a conventional machine tool slide 10, which supports a work piece to be machined, is translated by the rotation of a conventional machine lead screw. A conventional incremental encoder 11 is coupled to the machine lead screw to generate a binary signal $\phi_A$ and a binary signal $\phi_B$ that are 90° out of phase with each other, and a binary signal $\phi_C$.

For the purpose of illustration, it is assumed that slide 10 translates one inch for each complete rotation of the machine lead screw. Encoder 11 comprises a code wheel mounted on the machine lead screw. The code wheel has 250 slits distributed uniformly about its circumference. A first light emitting diode and a first photocell are aligned with each other on opposite sides of the wheel in the path of the slits. A second light emitting diode and a second photocell are aligned with each other on opposite sides of the wheel in the path of the slits displaced from the first light emitting diode and photocell so as to provide the 90° phase relationship between signals $\phi_A$ and $\phi_B$. As the machine lead screw rotates, the transmission of light to the first and second photocells is interrupted to form signals $\phi_A$ and $\phi_B$ at the photocell outputs. Two hundred fifty cycles of each of signals $\phi_A$ and $\phi_B$ occur for each complete revolution of the code wheel, and thus for each complete revolution of the machine lead screw. The code wheel also has a single slit displaced laterally from the plurality of slits. A third light emitting diode and a third photocell are aligned with each other on opposite sides of the code wheel in the path of the single slit. Transmission of light to the third photocell forms signal $\phi_C$ at the photocell output. One cycle of signal $\phi_C$ occurs for each complete revolution of the code wheel, and thus the machine lead screw.

Figure 4A:
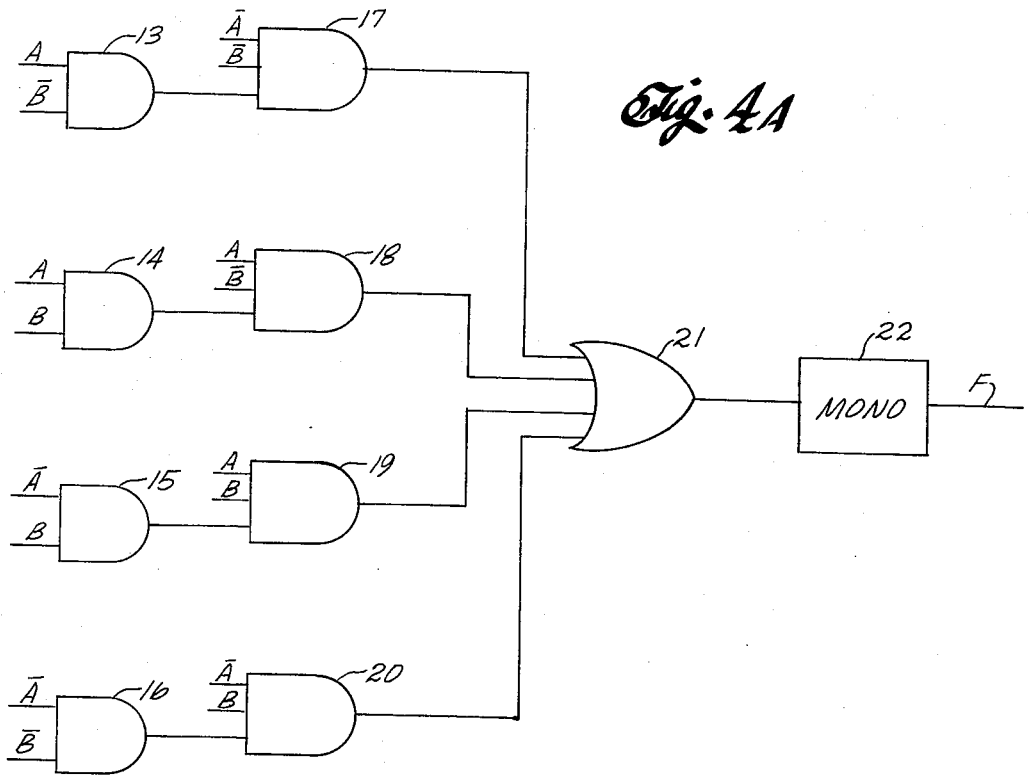
FIGS. 4A and 4B are schematic diagrams of the signal conditioning circuitry of FIG. 1, and FIG. 4C are waveform diagrams.
Figure 4C:
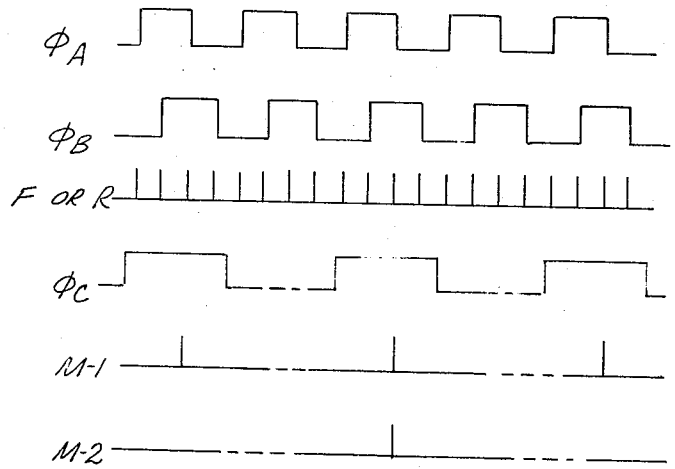
Figure 4B:
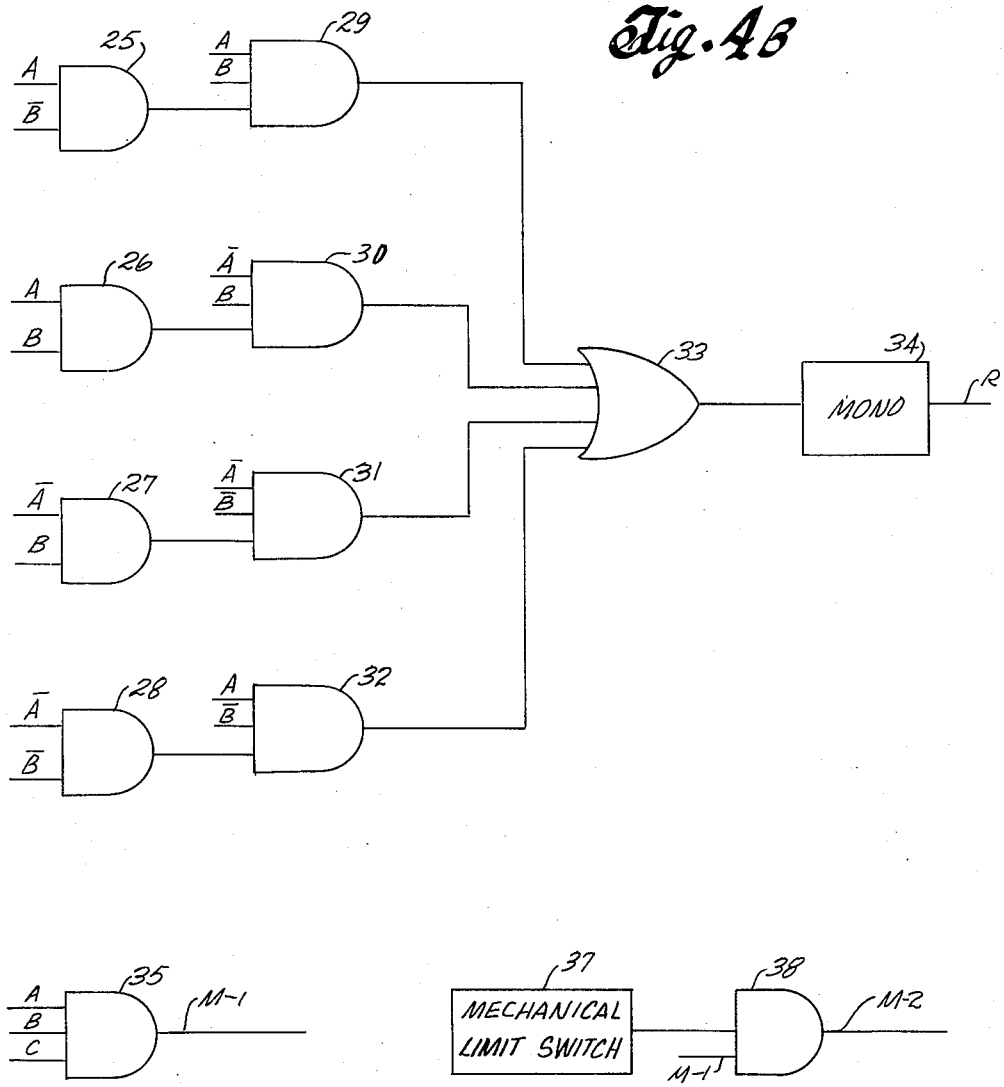

Signals $\phi_A$, $\phi_B$, and $\phi_C$ are transmitted by incremental encoder 11 to signal conditioning circuitry 12, which is shown in detail in FIGS. 4A and 4B. Signals $\phi_A$, $\phi_B$, and $\phi_C$ as a function of slide displacement are represented in FIG. 4 C. Each signal is high when light is transmitted to its photocell and is low when no light is transmitted to its photocell. In FIG. 4A, AND gates 13, 14, 15, and 16 have inputs that represent the present state of signals $\phi_A$ and $\phi_B$; specifically, these inputs are different combinations of A, $\bar{A}$, B, and $\bar{B}$, as shown, where A is signal $\phi_A$, $\bar{A}$ is the inverse of signal $\phi_A$, B is signal $\phi_B$, and $\bar{B}$ is the inverse of $\phi_B$. AND gates 17, 18, 19, and 20 have inputs that represent the prior state of signals $\phi_A$ and $\phi_B$; specifically, these are different combinations of A, $\bar{A}$, B, $\bar{B}$, and the outputs of AND gates 13 through 16, as shown. The memory required to provide the present and past states of signals $\phi_A$ and $\phi_B$ could be, for example, a shift register that is shifted responsive to each change of state of signal $\phi_A$ or signal $\phi_B$. The outputs of AND gates 17 through 20 are coupled by an OR gate 21 to the trigger input of a monostable multivibrator (MONO) 22. There are four different combinations of the present and prior states of signals $\phi_A$ and $\phi_B$ that occur when slide 10 is moving in a forward direction, namely, the states represented by AND gates 13 and 17, the states represented by AND gates 14 and 18, the states represented by AND gates 15 and 19, and the states represented by AND gates 16 and 20. AND gates 13 through 16 detect the present state of signals $\phi_A$ and $\phi_B$, and AND gates 17 through 20 compare the present state thereof with the prior state. When a particular combination of signals $\phi_A$ and $\phi_B$ representing forward movement of slide 10 occurs, a trigger pulse is coupled through OR gate 21 to the trigger input of multivibrator 22, which generates a pulse of fixed duration at an output F. As represented by waveform F in FIG. 4C, four pulses are produced at output F of multivibrator 22 for each change of state of signal $\phi_A$ or $\phi_B$. Thus, when slide 10 is moving in a forward direction, the output of multivibrator 22 produces a pulse for each 0.001 inch of translation. In FIG. 4B, AND gates 25 through 32 respond to the combinations of A, $\bar{A}$, B, and $\bar{B}$ representing movement of slide 10 in the reverse direction. AND gates 25, 26, 27, and 28 function during movement of slide 10 in the reverse direction in the same manner as AND gates 13 through 16 function in the forward direction, and AND gates 29, 30, 31, and 32 function during movement of slide 10 in the reverse direction in the same manner as AND gates 17 through 20 function in the forward direction. The output of AND gates 29 through 32 are coupled through an OR gate 33 to the trigger input of a monostable multivibrator (MONO) 34. As represented by waveform R in FIG. 4C, four pulses are produced at output R of multivibrator 34 for each change of state of signal $\phi_A$ or $\phi_B$. An AND gate 35 has inputs A, B, and C, where C is signal $\phi_C$. AND gate 35 has an output M-1. As represented by waveform M-1 in FIG. 4C, a pulse is produced at output M-1 one time for each 1000 pulses of output F or output R, i.e., for each complete revolution of the machine lead screw.

A mechanical limit switch 37, which moves with slide 10, is actuated by a stationary cam when slide 10 is in its reference or zero position. Limit switch 37 is connected to one input of an AND gate 38, and output M-1 is connected to the other input thereof. AND gate 38 has an output M-2. To prevent ambiguity, limit switch 37 must be actuated for less than one revolution of the machine lead screw. After each machine tool operation, slide 10 is returned to its reference position by means not a part of this invention. When slide 10 moves to its reference position, limit switch 37 is actuated and a pulse is produced at output M-2 of AND gate 38. As represented by waveform M-2 in FIG. 4C, such pulse appears at one and only one position of slide 10, namely, the reference position thereof.

Information representative of positional limits of slide 10 and output switches to be actuated when slide 10 is located within such limits is stored in binary digital form in an addressable memory 44 having ten address inputs. For the purpose of illustration, it is assumed that this information is stored in memory 44 in sixty-four words, each word has a fixed length of sixteen bytes, and each byte has four bits. Responsive to the states of address counters 45 and 46, the information stored in memory 44 appears at four outputs 47, a byte at a time. A clock source 53 is connected to the input of address counter 45, which has sixteen states and four outputs 48 connected to the four least significant address inputs of memory 44, and to the inputs of an AND gate 49. The output of AND gate 49 is connected to the input of address counter 46, which has sixty-four states and six outputs 50 connected to the most significant address inputs of memory 40. Responsive to each pulse produced by clock source 53, address counter 45 advances one state. When address counter 45 advances through all of its sixteen states, which corresponds to one word stored in memory 44, address counter 46 advances one state responsive to the output of AND gate 49. The advance of address counter 46 through all of its sixty-four states corresponds to the sixty-four words stored in memory 44. In summary, responsive to the pulses from clock source 53, address counters 45 and 46 advance sequentially, through a total of 1,024 different states, which supplies an equal number of different addresses to memory 44. Each such address retrieves from memory 44 a different byte, which appears at outputs 47. Thus, the sixty-four words stored in memory 44 are repeatedly scanned a byte at a time, appearing at outputs 47 in a pedetermined sequence. Outputs 48 of address counter 45 are connected to the four inputs of a timing pulse decoder 51 that has sixteen outputs 52. By a conventional arrangement of AND gates, outputs 52 are sequentially energized to produce timing pulses corresponding to the sixteen combinations of states of outputs 48. The following table sets forth the relationship between the individual timing pulses generated at outputs 52, as identified in FIG. 1, and the information represented by the corresponding bytes of each word stored in memory 44.

| Timing Pulse | Information in Byte |
| --- | --- |
| C0-LL | Head No. - BC |
| C1-LL | LOWER LIMIT (MSD) - BCD |
| C2-LL | LOWER LIMIT - BCD |
| C3-LL | LOWER LIMIT - BCD |
| C4-LL | LOWER LIMIT - BCD |
| C5-LL | LOWER LIMIT - BCD |
| C6-LL | LOWER LIMIT (LSD) - BCD |
| C7-LL | (1) FWD ONLY (2) REV ONLY (3) ALL HEADS (4) NOT USED |
| C0-UL | NOT USED |
| C1-UL | UPPER LIMIT (MDS) - BCD |
| C2-UL | UPPER LIMIT - BCD |
| C3-UL | UPPER LIMIT - BCD |
| C4-UL | UPPER LIMIT - BCD |
| C5-UL | UPPER LIMIT - BCD |
| C6-UL | UPPER LIMIT (LSD) - BCD |
| C7-UL | OUTPUT SWITCH - BC |

Outputs M-1, M-2, F, and R of signal conditioning circuitry 12 are connected to a reversible counter 59, which has a capacity equal to the algebraic sum of the pulses produced at outputs F and R of signal conditioning circuitry 12, in this case one million. The outputs of counter 59 are coupled to gates 60 having four output busses 61. A comparator 62 has the capacity of comparing two inputs a byte at a time. Busses 61 are connected to one input of comparator 62, and outputs 47 of memory 44 are connected to the other input of comparator 62.

Figure 5:
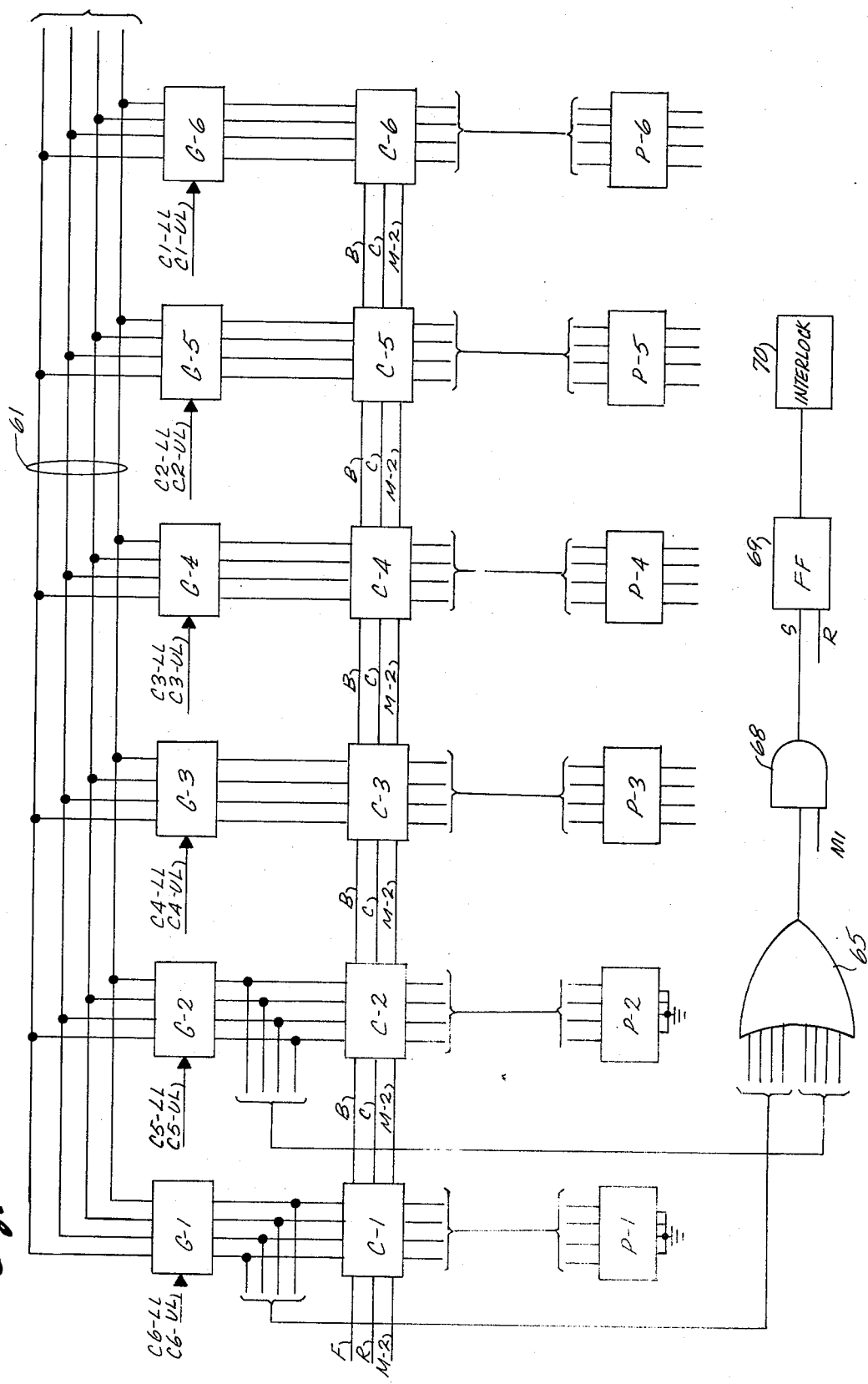
FIG. 5 is a schematic diagram of the reversible counter and gates of FIG. 1 together with the logic for operating an interlock.

Reference is made to FIG. 5 for a further description of counter 59 and gates 60. Counter 59 comprises stages C-1 through C-6, each of which counts one decade in a binary decimal code. Stages C-1 through C-6 are connected in tandem in order of increasing significance, i.e., stage C-1 counts the thousandths decade, C-2 counts the hundredths decade, C-3 counts the tenths decade, C-4 counts the tens decade, C-5 counts the hundreds decade, and C-6 counts the thousands decade. Outputs F and R from signal conditioning circuitry 12 are connected to the inputs of stage C-1, and borrow and carry outputs of each stage are connected to the subsequent stage as indicated by the connections designated B and C. Stages C-1 through C-6 each have four outputs connected, respectively, to the inputs of gates G-1 through G-6, which comprise gates 60. The outputs of gates G-1 through G-6 are connected to busses 61. When a timing pulse is applied to a gating input of one of gates G-1 through G-6, the input to such gate is transmitted to the output thereof and, therefore, to busses 61. Timing pulses C6-LL and C6-UL are applied to the gating input of gate G-1, timing pulses C5-LL and C5-UL are applied to the gating input of gate G-2, timing pulses C4-LL and C4-UL are applied to the gating input of gate G-3, timing pulses C3-LL and C3-UL are applied to the gating input of gate G-4, timing pulses C2-LL and C2-UL are applied to the gating input of gate G-5, and timing pulses C0-LL and C0-UL are applied to the gating input of gate G-6. Thus, the decades of the number stored in the counter are transferred to busses 61 a decade at a time in decreasing order of significance. Stages C-1 through C-6 each have four preset inputs and a loading input for presetting the stage to a state represented by the values of binary signals applied to the preset inputs when the loading input is energized. Patchboards P-1 through P-6 each have four outputs connected, respectively, to the preset inputs of stages C-1 through C-6. When an input of one of patchboards P-1 through P-6 is grounded, the corresponding output of the patchboard presets the input of the counter to which it is connected to a binary value of zero upon actuation of the load input. When an input of one of patchboards P-1 through P-6 is biased to a particular potential, the corresponding output of the patchboard presets the input of the counter to which it is connected to a binary value of one upon actuation of the loading input. The inputs of patchboards P-1 and P-2 are all grounded to preset the thousandths and hundredths decades to zero when the loading inputs of stages C-1 and C-2 are energized. The inputs of patchboards P-3 through P-6 are selectively biased or grounded as desired to shift the effective reference or zero position of slide 10 relative to the actual position of mechanical limit switch 37 and its cam. This in effect establishes a pseudo reference position at any desired slide position. Output M-2 of signal conditioning circuitry 12 is connected to the load input of each of stages C-1 through C-6 as shown in FIG. 5. Thus, when slide 10 is returned to its reference position by means that are not part of this invention, output M-2 becomes high, the load inputs of stages C-1 through C-6 are energized, and stages C-1 through C-6 are preset to the states represented by patchboards P-1 through P-6, respectively.

In summary, the number stored in counter 59 represents the displacement of slide 10 relative to the pseudo reference position, or if counter 59 is preset to zero, relative to the actual reference position determined by the mechanical limit switch.

Since stages C-1 and C-2 are always preset to zero at the reference position of slide 10 (actual or effective), which is the starting point for each operation of the machine tool, under proper operating conditions stages C-1 and C-2 always return to zero for each complete revolution of the machine lead screw away from the reference position, i.e., each time output M-1 of signal conditioning circuitry 12 generates a pulse, an OR gate 65, and an AND gate 68 check to determine that this condition is met. The outputs of stage C-1 are connected to the inputs of OR gate 65. The output of OR gates 65 and output M-1 are connected to the inputs of AND gate 68. The output of AND gate 68 is connected to the set input of an R-S flip-flop 69. The output of flip-flop 69 is coupled to an interlock 70, which disables machine tool operation when flip-flop 68 is set. So long as stages C-1 and C-2 are both zero after a complete revolution of the machine lead screw, the outputs of OR gates 65 and 66 are high, and the output of NAND gate 67 is low when output M-1 is high. As a result, the output of AND gate 68 is low and flip-flop 69 is not set. When stages C-1 and C-2 are not both zero after a complete revolution of the machine lead screw, one or more of the inputs to OR gates 65 and/or 66 are high, and the output of NAND gate 67 is high when output M-1 is high. In such case, the output of AND gate 68 becomes high and flip-flop 69 is set. As a result, interlock 70 is actuated. When operation is to be resumed after interlock 70 is actuated, flip-flop 69 is reset by energizing its R input.

As shown in FIG. 1, a source of head numbers 74 is coupled by a gate 71 to the same input of comparator 62 as gates 60. For purposes of illustration, it is assumed that source 74 has four outputs that produce a signal in binary code representative of one of sixteen different machine tool head that is, or is about to be, brought into operation. Typical operations performed by the heads are forming, grinding, and cutting. Source 74 could be a punched paper tape and tape reader or any other source of an electrical signal representative of the head in operation. Responsive to the application of a timing pulse C0-LL to a gate input, gate 71 transfers the output signal of source 74 to comparator 62.

Comparator 62 has outputs H, E, and L that are connected to logic circuitry 72 along with outputs 47 of memory 44. Outputs 47 of memory 44 and logic circuitry 72 are connected to output circuitry 73. As can be seen from the description so far, including the table on page 10, the head representative byte of each word stored in memory 44 is transferred by output 47 to comparator 62 at the same time as the head number is transferred from source 74 to comparator 62, namely, at the occurrence of timing pulse C0-LL. When these are identical, output E of comparator 62 is energized. Similarly, each lower limit representative byte of each word stored in memory 44 is transferred by output 47 to comparator 62 at the same time as the state of the corresponding decade of counter 59. Similarly, each upper limit representative byte of each word stored in memory 44 is transferred by output 47 to comparator 62 at the same time as the state of the corresponding decade of counter 59. When the signal at the first input of comparator 62 represents a higher number than the signal at the second input, output H is energized, and when the signal at the first input of comparator 62 is lower than the signal at the second input of comparator 62, output L is energized.

Responsive to outputs H and L of comparator 62, logic circuitry 72 determines when slide 10 is between the positional limits represented by each word stored in memory 44, and the byte of such word representative of an output switch is transferred from memory 44 to output circuitry 73, if the other conditions discussed below are met.

Figure 2:
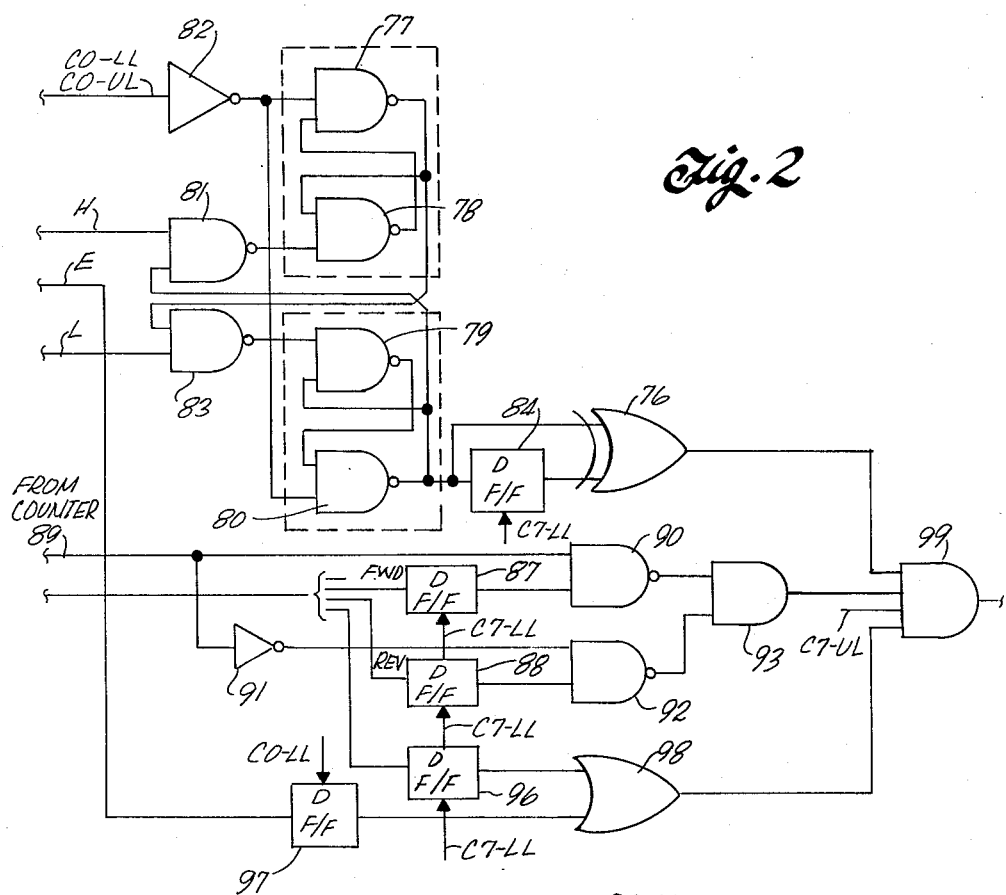
FIG. 2 is a schematic diagram of the logic circuitry of FIG. 1.

Reference is made to FIG. 2 for a further description of logic circuitry 72. As previously stated, comparator 62 (FIG. 1) compares the number stored in counter 59 with the upper and lower limit of each word stored in memory 44 on a digit-by-digit basis in descending order of significance. Since the number stored in counter 59 is in binary decimal code, comparison on a digit-by-digit basis is also decade-by-decade. A single exclusive OR gate 76 senses when the number stored in counter 59 is between the limits of a word stored in memory 44. When one input or the other of exclusive OR gate 76 is high, its output is high; when both of its inputs are low or both of its inputs are high, its output is low. NAND gates 77 and 78 are cross coupled to form a first R-S flip-flop, and NAND gates 79 and 80 are cross coupled to form a second R-S flip-flop. Output H and the output of NAND gate 80 are connected to the inputs of a NAND gate 81. The output of NAND gate 81 and the output of NAND gate 77 are connected to the inputs of NAND gate 78. The output of NAND gate 78 is connected to one input of NAND gate 77. Outputs C0-LL and C0-UL of timing pulse decoder 51 are coupled through an inverter 82 to the other input of NAND gate 77. The output of NAND gate 77 and output L of comparator 62 are connected to the inputs of a NAND gate 83. The outputs of NAND gates 83 and 80 are connected to the inputs of NAND gate 79. The output of NAND gates 79 and the output of inverter 82 are connected to the inputs of NAND gate 80. The output of NAND gate 80 is connected to one input of exclusive OR gate 76 and to the input of a D type flip-flop (F/F) 84. The output of NAND gates 77 through 81 and 83 and the other NAND gates referred to herein are each low when all their inputs are high, and are high for all other input states. Output C7-LL of timing pulse decoder 51 is connected to the control input of flip-flop 84. The output of flip-flop 84 is connected to the other input of exclusive OR gate 76. Flip-flop 84 and the other D type flip-flops referred to herein transfer to their output the state of their input, i.e., high or low, when their control input becomes high.

The described arrangement of logic circuitry 72 detects and stores only the first inequality of the digit-by-digit comparison of a limit of a word stored in memory 44 and the number stored in counter 59 indicated by comparator 62, and thereafter locks out all further inequalities indicated by comparator 62 because these indications are not significant in determining whether the number stored in counter 59 is larger or smaller than the compared limit. Logic circuitry 72 repeats its cycle each time a new word is retrieved from memory 44 under the control of outputs 52 of timing pulse decoder 51. During each cycle, the lower limit and the upper limit are each compared one after the other with the number stored in counter 59. When output C0-LL of timing pulse decoder 51 is high, i.e., when timing pulse C0-LL appears, the first and second R-S flip-flops both become reset, the outputs of NAND gates 77 and 80 go high, and the outputs of NAND gates 78 and 79 go low. Thereafter, the number stored in counter 59 is compared with the lower limit of the word retrieved from memory 44 on a digit-by-digit basis in descending order of significance, as outputs C1-LL through C6-LL of pulse timing decoder 51 go high in sequence. When the first inequality is indicated by comparator 62, either the first or second R-S flip-flop is set. If the unequal digit of the number stored in counter 59 is larger than the lower limit, the first flip-flop is set. Specifically, output H of comparator 62 goes high, the output of NAND gate 81 goes low, the output of NAND gate 78 goes high, and the output of NAND gate 77 goes low; the cross connection from the output of NAND gate 77 through NAND gate 83 to the input of NAND gate 79 locks out the second R-S flip-flop, i.e., prevents it from becoming set if a subsequent digit of the number stored in counter 59 is smaller than the lower limit. If the unequal digit of the number stored in counter 59 is smaller than the lower limit, the second flip-flop is set. Specifically, output L of comparator 62 goes high, the output of NAND gate 83 goes low, the output of NAND gate 79 goes high, and the output of NAND gate 80 goes low; the cross connection from the output of NAND gate 80 through NAND gate 81 to the input of NAND gate 78 locks out the second R-S flip-flop, i.e., prevents it from becoming set if a subsequent digit of the number stored in counter 59 is larger than the lower limit. The state of the second flip-flop at the end of the comparison of the number stored in counter 59 with the lower limit is stored in flip-flop 84 when output C7-LL goes high. Thus, the output of flip-flop 84 is high if the number stored in counter 59 is larger than the lower limit, and is low if the number stored in counter 59 is smaller than the lower limit.

When output C0-UL of pulse timing decoder 51 goes high, the first and second R-S flip-flops become reset and thereafter operate in the same manner during the comparison of the number stored in counter 59 with the upper limit as outputs C1-UL through C6-UL go high in sequence. When output C7-UL goes high, the output of NAND gate 80 is low if the number stored in counter 59 is smaller than the upper limit, and is high if the number stored in counter 59 is larger than the upper limit. At this time, the output of exclusive OR gate 76 is therefore high if the number stored in counter 59 is between the limits of the retrieved word, and is low if the number stored in counter 59 is outside the limits of the retrieved word. (If the number stored in counter 59 is below the lower limit, the inputs of exclusive OR gate 76 are both low, and if the number stored in counter 59 is above the upper limit, the inputs of exclusive OR gate 76 are both high.)

In some cases, it is desired to actuate an output switch only when slide 10 is between limits and moving in a particular direction, i.e., forward or reverse. In such case, referring to the chart below, either the FWD bit or the REV bit of the byte corresponding to timing pulse C7-LL is high. If an output switch is to be actuated only when slide 10 is moving in a forward direction, the FWD bit is high; if an output switch is to be actuated only when slide 10 is moving in a reverse direction, the REV bit is high; and if the direction of movement of slide 10 is not a condition to the actuation of an output switch, the FWD and REV are both high. The FWD and REV bits of each word retrieved from memory 44 are applied to the inputs of a D type flip-flop 87 and a D type flip-flop 88, respectively. The C7-LL output of timing pulse decoder 51 is connected to the control inputs of flip-flops 87 and 88 to store the FWD and REV bits when they are retrieved.

Outputs F and R of signal conditioning circuitry 12 are connected to a dead end counter (FIG. 1) of conventional construction. Dead end counter 89 has a given number of states, e.g., sixteen; its output is high for half the states, e.g., eight, low for half the states, e.g., eight, and does not recycle at its end states. Responsive to each pulse at output F of signal conditioning circuitry 12, counter 89 advances a state up to a maximum of 16 states, and stops at the highest state. Responsive to each pulse at output R of signal conditioning circuitry 12, counter 89 retreats a state through a maximum of 16 states, and stops at the lowest state. For the purpose of illustration, it is assumed that the output of counter 89 is high for its highest one-half states, and is low for its lowest one-half states.

In FIG. 2, the output of counter 89 is directly connected to one input of a NAND gate 90 and through an inverter 91 to one input of a NAND gate 92. The output of flip-flop 87 is connected to the other input of NAND gate 90, and the output of flip-flop 88 is connected to the other input of NAND gate 92. The outputs of NAND gates 90 and 92 are connected to the inputs of a NAND gate 93. If the direction of movement of slide 10 is a condition for the actuation of an output switch, the output of one or the other of flip-flops 87 and 88 is high. The direction of slide movement is indicated by the output of counter 89. If the condition is met with respect to the forward direction, the output of NAND gate 90 is low, and if the condition is met with regard to the reverse direction, the output of NAND gate 92 is low; in either case, the output of NAND gate 93 is high to indicate that the condition is met. Similarly, if the direction of slide 10 is not a condition to the actuation of an output switch, the outputs of flip-flops 87 and 88 are both high, the output of NAND gate 90 or 92, depending upon the actual direction of slide movement, is low, and the output of NAND gate 93 is high. Counter 89 renders the described condition sensing arrangement of logic circuitry 72 insensitive to small spurious fluctuations in the direction of slide movement, because counter 89 will only go high to indicate slide movement in the forward direction after slide 10 has moved sufficiently far to advance counter 89 through half its states, e.g., eight states. The capacity of counter 89 depends upon the amplitude of the spurious slide fluctuations to be ignored by the circuitry.

Normally, it is desired to perform some of the machine tool operations only when a particular head is in place, and to perform other operations regardless of which head is in place. In the latter case, the bit ALL HEADS of the byte of words stored in memory 44 corresponding to timing pulse C7-LL is high. (See the chart below.) In the former case, the ALL HEADS bit is low. The ALL HEADS bit of each word retrieved from memory 44 is applied to the input of a D type flip-flop (F/F) 96. Output C7-LL of timing pulse decoder 51 is connected to the control input of flip-flop 96 to store the ALL HEADS bit when it is retrieved from memory 44. Output E of comparator 62 is connected to the input of a D type flip-flop (F/F) 97. As indicated by the chart on page 10, the byte of each word representing the head number of the operation to be performed, is retrieved from memory 44 when output C0-LL of timing pulse decoder 51 is high. At the same time, gates 71 transmit the output of source 74 to comparator 62 for comparison with the head number of the retrieved word. When output E of comparator 62 is high at this time, identity of the desired head number and the head number of the retrieved word is indicated. In order to store this indication in flip-flop 97, output C0-LL of timing pulse decoder 51 is connected to the control input of flip-flop 97. The outputs of flip-flops 96 and 97 are connected to the inputs of an OR gate 98. If the ALL HEADS bit of the retrieved word is high and/or comparator 62 indicates identity between the head numbers represented by the retrieved word and the head number represented by source 74, the output of OR gate 98 is high; otherwise, it is low. The outputs of exclusive OR gate 76, NAND gate 93, OR gate 98, and output C7-LL of timing pulse decoder 51 are connected to the inputs of an AND gate 99.

To summarize the operation of logic circuitry 72, it determines when three conditions are met, namely, whether the slide position is within the limits specified by the retrieved word, whether the slide is moving in the direction specified by the retrieved word, if any, and whether the head specified by the retrieved word, if any, is in place. If all three conditions are met, the output of AND gate 99 goes high when output C7-UL goes high to generate an output switch actuating signal, which as shown in FIG. 1 is coupled to output circuitry 72.

Figure 3:
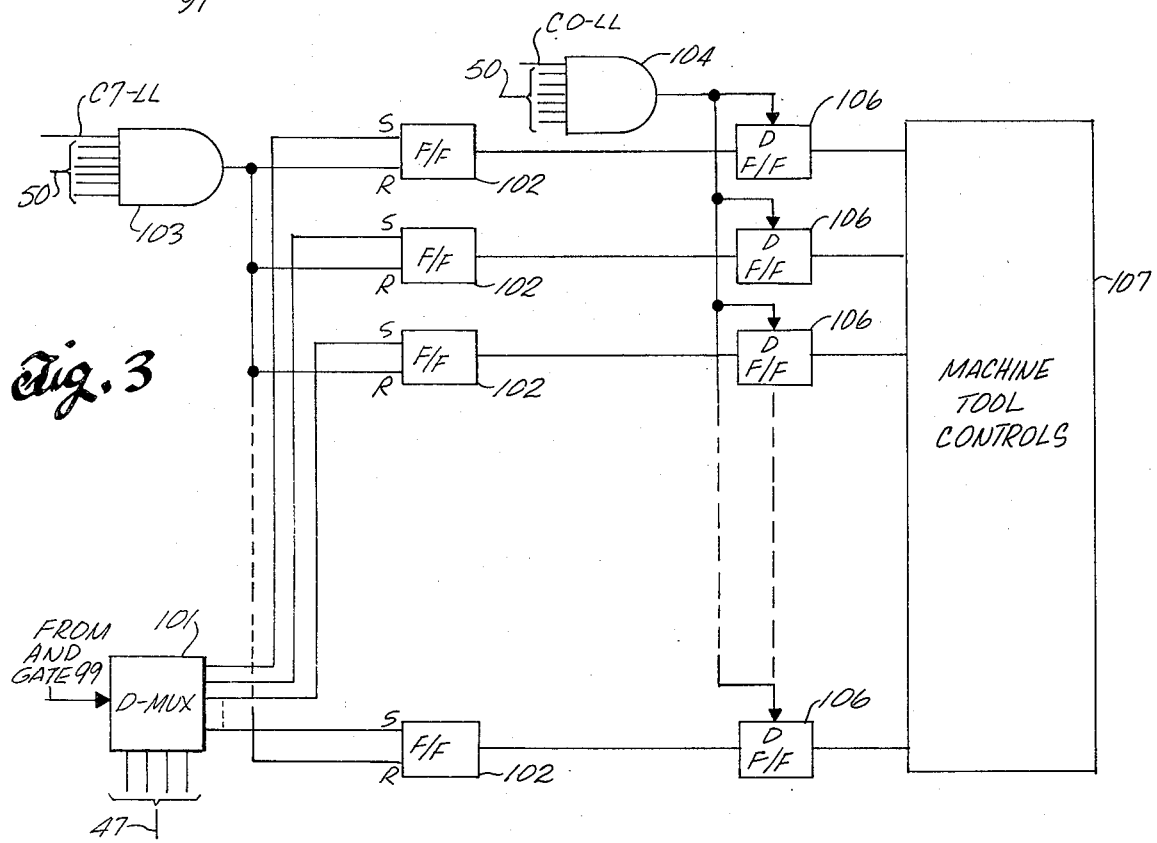
FIG. 3 is a schematic diagram of the output circuitry of FIG. 1.

Reference is made to FIG. 3 for a detailed description of output circuitry 73. Outputs 47 from memory 44 (FIG. 1) are connected to selection inputs of a demultiplexer (D-MUX) 101. The output of AND gate 99 (FIG. 2) is connected to a transmit input of demultiplexer 101. The outputs of demulltiplexer 101 are connected, respectively, to the set inputs of a plurality of R-S flip-flops (F/F) 102. For the purpose of illustration, it is assumed there are four transmit inputs and sixteen such R-S flip-flops. Demultiplexer 101 routes the binary signal from AND gate 99 to the set input of one of flip-flops 102, depending upon the state of outputs 47. Demultiplexer 101 could comprise a plurality of AND gates equal in number to flip-flops 102, each AND gate having as inputs the output of AND gate 99 and a different state of outputs 47. A plurality of output switches in the form of D type flip-flops (F/F) 106 equal in number to flip-flops 102 have inputs to which the outputs of flip-flops 102, respectively, are connected. Output C7-LL of timing pulse decoder 51 and outputs 50 from word address counter 46 (FIG. 1) are connected to the inputs of an AND gate 103. The output of AND gate 103 is connected to the reset input of each of flip-flops 102. Output C0-LL and outputs 50 from word address counter 46 are connected to the inputs of an AND gate 104. The output of AND gate 104 is connected to the control input of each of flip-flops 106. As shown in the chart on page 10, the byte of each word retrieved from memory 44 representing the output switch to be actuated is retrieved when output C7-UL of timing pulse decoder 51 is high. Thus, when all the conditions imposed by a retrieved word are met, the byte of such word representing the output switch to be actuated is transmitted to the selection inputs of demultiplexer 101 as the output of AND gate 99 goes high. As a result, the set input of one, and only one, of flip-flops 102, depending upon the byte of the retrieved word applied to the selection inputs, i.e., the states of outputs 47, goes high, and the output of such flip-flop 102 also goes high. Once each cycle of retrievel of information stored in memory 44, namely, upon occurrence of timing pulse C0-LL corresponding to one of the words stored in memory 44, e.g., the last word, the output of AND gate 104 goes high and flip-flops 106 sample the outputs of flip-flops 102. On the occurrence of timing pulse C7-LL corresponding to the same word retrieved from memory 44, the output of AND gate 103 goes high to reset all of flip-flops 102. Flip-flops 106 are connected to the inputs of a process controller for machine tools represented by a block 107. Responsive to flip-flops 106, process controller 107 could control any number of machine tool operations that have been automatically controlled in the past by means of a cam actuated mechanical limit switch of the type the present invention replaces, including grinding, cutting, and forming operations. In summary, any time during retrieval of information stored in memory 44, the output of AND gate 99 goes high, one of flip-flops 102 is set; once each complete cycle of retrieval of information stored in memory 44, the status of the output switches, i.e., flip-flops 106, is first updated by transfer of the states of flip-flops 102 to flip-flops 106, and then, seven timing pulses later, flip-flops 102 are all reset.

The described cycle of retrieval of information stored in memory 44 and operation of logic circuitry 72 is typically repeated at a rate of 125 cycles per second, to rapidly update the states of the output switches at this rate by actuating one or the other of such output switches at the proper slide position as slide 10 moves back and forth, e.g., at a typical linear speed of 10 in./sec responsive to external control, which is not part of this invention.

In summary, the function of a mechanical limit switch for sensing the position of a movable member is carried out electronically by an addressable binary memory, a special purpose computer, and a transducer that generates a binary number representative of the displacement of the movable member from a reference position, pseudo or actual. A number of words are stored in the addressable memory. Each word is representative of an output switch, the positional limits of the movable member within which such output switch is to be actuated, and any other conditions to be met for switch actuation, such as direction of movement of the movable member. The special purpose computer scans the addressable memory and in synchronism with such scanning compares the limits of each word stored in the memory with the number generated by the transducer, determines whether the other conditions imposed by such word are met, and, if the number represented by the transducer is within the limits and the other conditions are met, actuates the output switch represented by such word.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, if the invention is to be employed with a single head, the described components associated with the determination of whether the head condition is met, including source 74 and gates 71 could be eliminated. Although it is preferable to store a byte representative of the output switches in each word of memory 44 to permit reprogramming of the relationship between the limits and output switches, a hardwired relationship could be set up between each address in memory and a particular output switch or switches; when the slide is within the limits of a word stored in memory, the address of such word indicates a particular output switch which is then actuated by the hardwired connection. Instead of storing an upper and lower limit in each word, a single limit could be employed; however, this would require doubling of the number of output switches to perform the same number of operations—one output to start the operation and another output to terminate the operation. Although the invention is especially useful as a limit switch for automatic machine tool operation, it can also be utilized in connection with the automatic control of other position dependent automatic processes, such as automatic assembly, automatic inspection, automatic warehousing, and order picking.

What is claimed is:

1. A programmable limit switch for a movable member comprising:
   means for generating a first digital signal representative of the position of the movable member;
   a plurality of actuatable output switches;
   means for storing a plurality of second digital signals each representative of a plurality of positions between an upper limit and a lower limit;
   means for relating each second signal to one of the output switches;
   means for comparing the first signal with the upper and lower limit of each of the plurality of second signals; and means responsive to the comparing means and the relating means for actuating the output switch related to one of the plurality of second signals, when the position represented by the first signal is between the upper and lower limits of such one of the plurality of second signals.

2. The limit switch of claim 1, in which the actuating means comprises exclusive OR logic means having a first input responsive to a comparison of the first signal and the lower limit of each of the plurality of second signals, and a second input responsive to a comparison of the first signal and the upper limit of each of the plurality of second signals.

3. The limit switch of claim 2, in which the exclusive OR logic means comprises a single exclusive OR gate and the comparing means comprises means for comparing the first signal with each of the plurality of second signals sequentially on a digit-by-digit basis in descending order of significance, a first memory device responsive to the comparing means to store a first indication when the compared digit of the first signal is larger than the compared digit of the second signal being compared, means for locking out the first memory device after it stores said first indication for each second signal, a second memory device responsive to the first memory device to store a second indication when the first indication is stored in the first memory device after comparison of the first signal and one limit of each second signal, and a third memory device responsive to the first and second memory devices to store a third indication when the second indication is stored in the second memory device and the first indication is not stored in the first memory device after comparison of the first signal and the other limit of each second signal.

4. The limit switch of claim 3, additionally comprising a source of a third signal representative of a selected one of a plurality of conditions, the plurality of second signals each having a portion representative of one of the plurality of conditions; means for comparing the third signal with the portion of each of the plurality of second signals representative of the conditions; and means for disabling the actuating means when the last named comparing means indicates a lack of identity between the selected one of the conditions and the condition represented by one of the plurality of second signals.

5. The limit switch of claim 4, in which the plurality of second signals each comprise a first field representative of the plurality of positions; the relating means comprise means for storing a signal representative of the output switch in a second field of each of the plurality of second signals, the comparing means compares the first signal with the first field of each of the plurality of second signals, and the actuating means actuates the output switch represented by the second field of one of the plurality of second signals when the first signal is between the upper and lower limits of such one of the plurality of second signals.

6. The limit switch of claim 5, in which the first signal generating means comprises means for generating pulses proportional in number to the incremental displacement of the movable member from a reference position, a reversible binary counter for counting the incremental pulses, and means for applying the incremental pulses to the counter so as to advance the state of the counter when the incremental displacement of the movable member is in one direction from the reference position and to reverse the state of the counter when the incremental displacement of the movable member is in the other direction from the reference position such that the state of the binary counter represents the first signal.

7. The limit switch of claim 6, in which the counter is presettable, the first signal generating means additionally comprising means for generating a counter loading pulse when the movable member returns to its reference position, means for storing a binary number representative of a pseudo reference position, and means responsive to the counter loading pulse for presetting the counter to the stored number representative of the pseudo reference position.

8. The limit switch of claim 7, in which the movable member is rotatable a plurality of revolutions, the pulse generating means generates a given number of pulses per revolution of the movable member, and the first signal generating means additionally comprises means for generating a checking pulse responsive to each complete revolution of the movable member from the reference position and means responsive to each checking pulse for generating an interlock signal when the actual state of the counter differs from the preset state of the counter plus or minus a multiple of the given number of pulses per revolution.

9. The limit switch of claim 8, in which the counter comprises a plurality of stages each counting one decade in a binary decimal code, the given number of pulses comprises a given power of ten, the presetting means resets to zero a number of the least significant stages of the counter equal to the given power of ten, and the interlock signal generating means generates an interlock signal responsive to a checking pulse when the stages of the counter preset to zero are in a state other than zero upon the occurrence of such checking pulse.

10. The limit switch of claim 9, in which the plurality of second signals each have a portion representative of a desired direction of movement of the movable member, the limit switch additionally comprising:
  means for generating a signal representative of the actual direction of movement of the movable member;
  means for comparing the signal representative of the actual direction of movement with the portion of each of the plurality of second signals representative of the desired direction of movement; and
  means for disabling the actuating means when the last named comparing means indicates a lack of identity between the actual direction of movement and the desired direction of movement represented by one of the plurality of second signals.

11. The limit switch of claim 10, in which the means for generating a signal representative of the actual direction comprises a reversible deadend counter having an output that assumes a first binary value during one-half of its states and a second binary value during the other half of its states, and means for applying the incremental pulses to the counter so as to advance the state of the counter when the incremental displacement of the movable member is in one direction from the reference position and to reverse the state of the counter when the incremental displacement of the movable member is in the other direction from the reference position such that the state of the binary counter represents the first signal.

12. The limit switch of claim 1, in which the comparing means compares the first signal with each of the plurality of second signals sequentially.

13. The limit switch of claim 1, additionally comprising a source of a third signal representative of a selected one of a plurality of conditions, the plurality of second signals each having a portion representative of one of the plurality of conditions; means for comparing the third signal with the portion of each of the plurality of second signals representative of the conditions; and means for disabling the actuating means when the last named comparing means indicates a lack of identity between the selected one of the conditions and the condition represented by one of the plurality of second signals.

14. The limit switch of claim 1, in which the plurality of second signals each comprise a first field representative of the upper and lower limits and a second field representative of an output switch, the comparing means compares the first signal with the first field of each of the plurality of second signals, and the actuating means actuates the output switch represented by the second field of one of the plurality of second signals when the first signal is between the upper and lower limits of the first field of such one of the plurality of second signals.

15. The limit switch of claim 1, in which the first signal generating means comprises means for generating pulses proportional in number to the incremental displacement of the movable member from a reference position, a reversible binary counter for counting the incremental pulses, and means for applying the incremental pulses to the counter so as to advance the state of the counter when the incremental displacement of the movable member is in one direction from the reference position and to reverse the state of the counter when the incremental displacement of the movable member is in the other direction from the reference position such that the state of the binary counter represents the first signal.

16. The limit switch of claim 15, in which the counter is presettable, the first signal generating means additionally comprising means for generating a counter loading pulse when the movable member returns to its reference position, means for storing a binary number representative of a pseudo reference position, and means responsive to the counter loading pulse for presetting the counter to the stored number representative of the pseudo reference position.

17. The limit switch of claim 16, in which the movable member is rotatable a plurality of revolutions, the pulse generating means generates a given number of pulses per revolution of the movable member, and the first signal generating means additionally comprises means for generating a checking pulse responsive to each complete revolution of the movable member from the reference position and means responsive to each checking pulse for generating an interlock signal when the actual state of the counter differs from the preset state of the counter plus or minus a multiple of the given number of pulses per revolution.

18. The limit switch of claim 17, in which the counter comprises a plurality of stages each counting one decade in a binary decimal code, the given number of pulses comprises a given power of ten, the presetting means resets to zero a number of the least significant stages of the counter equal to the given power of ten, and the interlock signal generating means generates an interlock signal responsive to a checking pulse when the stages of the counter preset to zero are in a state other than zero upon the occurrence of such checking pulse.

19. The limit switch of claim 1, in which the plurality of second signals each have a portion representative of a desired direction of movement of the movable member, the limit switch additionally comprising:
means for generating a signal representative of the actual direction of movement of the movable member;
means for comparing the signal representative of the actual direction of movement with the portion of each of the plurality of second signals representative of the desired direction of movement; and
means for disabling the actuating means when the last named comparing means indicates a lack of identity between the actual direction of movement and the desired direction of movement represented by one of the plurality of second signals.

20. The limit switch of claim 19, in which the means for generating a signal representative of the actual direction comprises a reversible nonrecyclable deadend counter having an output that assumes a first binary value during one-half of its states and a second binary value during the other half of its states, and means for applying the incremental pulses to the deadend counter so as to advance the state of the deadend counter when the incremental displacement of the movable member is in one direction from the reference position and to reverse the state of the deadend counter when the incremental displacement of the movable member is in the other direction from the reference position such that the state of the deadend counter represents the first signal.

21. In a machine tool, the combination comprising:
one or more machine tool heads;
a movable machine tool slide for supporting a work piece or the one or more heads;
means for generating a first signal representative of the position of the slide;
a plurality of actuatable output switches;
means responsive to the output switches for controlling machine tool operations including the operation of the one or more heads;
means for storing a plurality of second signals each representative of an upper limit and a lower limit and an output switch;
means for comparing the first signal with each of the plurality of second signals; and
means responsive to the comparing means for actuating the output switch represented by one of the plurality of second signals when the position represented by the first signal lies between the limits represented by such one of the plurality of second signals to execute machine tool operations responsive to the position of the slide.

22. The combination of claim 21, in which the one or more machine tool heads comprises a plurality of machine tool heads, the combination additionally comprising:
a source of a third signal representative of a selected one of the plurality of machine tool heads, the plurality of second signals each having a portion representative of one of the plurality of machine tool heads;
means for comparing the third signal with the portion of each of the plurality of second signals representative of the machine tool heads; and
means for disabling the actuating means when the last named comparing means indicates a lack of identity between the selected one of the machine tool heads and the machine tool head represented by one of the plurality of second signals.

23. The combination of claim 22, in which the first and second signals are digital, the plurality of second signals each comprise a first field representative of upper and lower positional limits and a second field representative of an output switch, the comparing means compares the first signal with the first field of each plurality of second signals, and the actuating means actuates the output switch represented by the second field of one of the plurality of second signals when the position represented by the first signal lies between the limits represented by the first field of such one of the plurality of second signals.

24. The combination of claim 23, in which the plurality of second signals each have a portion representative of a desired direction of movement of the slide, the combination additionally comprising:
 means for generating a signal representative of the actual direction of movement of the slide;
 means for comparing the signal representative of the actual direction of movement with the portion of each of the plurality of second signals representative of the desired direction of movement; and
 means for disabling the actuating means when the last named comparing means indicates a lack of identity between the actual direction of movement and the desired direction of movement represented by one of the plurality of second signals.

25. The combination of claim 24, in which the first signal generating means comprises means for generating pulses proportional in number to the incremental displacement of the slide from a reference position, a reversible binary counter for counting the incremental pulses, and means for applying the incremental pulses to the counter so as to advance the state of the counter when the incremental displacement of the movable member is in one direction from the reference position and to reverse the state of the counter when the incremental displacement of the movable member is in the other direction from the reference position such that the state of the binary counter represents the first signal.

* * * * *

UNITED STATES PATENT AND TRADEMARK OFFICE
CERTIFICATE OF CORRECTION

PATENT NO. : 4,242,621
DATED : December 30, 1980
INVENTOR(S) : Carl P. Spaulding It is certified that error appears in the above-identified patent and that said Letters Patent are hereby corrected as shown below:

```
Col. 5, line 24, "(MDS)" should read --(MSD)--.
Col. 9, line 27, "below" should read --above--.
Col. 10, line 26, "below" should read --above--.
```

Signed and Sealed this

Third Day of November 1981

[SEAL]

Attest:

GERALD J. MOSSINGHOFF

Attesting Officer     Commissioner of Patents and Trademarks